United States Patent
Ke

(10) Patent No.: US 9,141,146 B2
(45) Date of Patent: Sep. 22, 2015

(54) LATCH DEVICE AND COMPUTER SYSTEM USING THE SAME

(71) Applicant: WISTRON CORP., New Taipei (TW)

(72) Inventor: Xian-Feng Ke, New Taipei (TW)

(73) Assignee: WISTRON CORP., New Taipei (TW)

( * ) Notice: Subject to any disclaimer, the term of this patent is extended or adjusted under 35 U.S.C. 154(b) by 115 days.

(21) Appl. No.: 14/185,935

(22) Filed: Feb. 21, 2014

(65) Prior Publication Data

US 2015/0085444 A1  Mar. 26, 2015

(30) Foreign Application Priority Data

Sep. 22, 2013  (CN) .......................... 2013 1 0432812

(51) Int. Cl.
*G06F 1/16* (2006.01)
*E05C 19/06* (2006.01)

(52) U.S. Cl.
CPC .............. *G06F 1/1679* (2013.01); *E05C 19/06* (2013.01); *Y10T 292/0934* (2015.04)

(58) Field of Classification Search
CPC combination set(s) only.
See application file for complete search history.

(56) References Cited

U.S. PATENT DOCUMENTS

| | | | |
|---|---|---|---|
| 7,181,238 B2 | 2/2007 | Chiang | |
| 7,813,125 B2 | 10/2010 | Huang | |
| 8,947,861 B2 * | 2/2015 | Staats et al. | 361/679.02 |
| 8,995,121 B2 * | 3/2015 | Yen | 361/679.44 |
| 9,019,695 B2 * | 4/2015 | Sun | 361/679.29 |
| 2006/0082161 A1 | 4/2006 | Minix | |
| 2013/0313090 A1 * | 11/2013 | Wu et al. | 200/320 |
| 2014/0126126 A1 * | 5/2014 | Chuang et al. | 361/679.01 |
| 2014/0133080 A1 * | 5/2014 | Hwang et al. | 361/679.17 |
| 2014/0185231 A1 * | 7/2014 | Kamimura et al. | 361/679.47 |
| 2014/0193193 A1 * | 7/2014 | Wikander et al. | 403/322.1 |
| 2014/0211409 A1 * | 7/2014 | Wolff et al. | 361/679.43 |
| 2014/0355196 A1 * | 12/2014 | Hashimoto et al. | 361/679.27 |
| 2014/0355210 A1 * | 12/2014 | Hashimoto et al. | 361/679.58 |
| 2015/0055289 A1 * | 2/2015 | Chang et al. | 361/679.43 |

FOREIGN PATENT DOCUMENTS

TW    I342737 B    5/2011

* cited by examiner

*Primary Examiner* — Lisa Lea Edmonds
(74) *Attorney, Agent, or Firm* — CKC & Partners Co., Ltd.

(57) ABSTRACT

A latch device includes a carrier, an operating member, a resilient member, two linkages, and two latch members. The operating member can move toward or away from the carrier along a first direction. The resilient member is disposed between the operating member and the carrier. Each of the linkages has a first end and a second end. The first ends are pivotally connected to two sides of the operating member. The latch members are slidably and symmetrically disposed on the carrier along a second direction, and pivotally connected to the second ends, respectively. The linkages are located between the latch members in a second direction perpendicular to the first direction. While moving relative to the carrier, the operating member drives the latch members respectively by the linkages, so as to reversely move the latch members relative to the carrier in the second direction.

19 Claims, 4 Drawing Sheets

LATCH DEVICE AND COMPUTER SYSTEM USING THE SAME

RELATED APPLICATIONS

This application claims priority to Chinese Application Serial Number 201310432812.9, filed Sep. 22, 2013, which is herein incorporated by reference.

BACKGROUND

1. Technical Field

The present disclosure relates to a latch device. More particularly, the present disclosure relates to a latch device that is used in a computer system.

2. Description of Related Art

With advance of science and technology in modern society, people have become increasingly demanding (e.g., compact volume, diverse functions, textured appearance, etc.) for consumer electronics products. Notebook computers, after a long development, evolve not only into tablet computers rise, but also a notebook-like computer (i.e., a tablet computer with a keyboard dock).

At present, when a tablet computer and a keyboard dock need to be connected to each other, known latch structures are mostly used to fasten a host and a display of a notebook. For example, a latch structure includes one spring and one linkage with unidirectional actuation (as disclosed in U.S. Pat. No. 7,181,238), and another latch structure includes two springs and two linkages with bi-directional actuation (as shown in Taiwan Patent No. I342737). As to the known latch structure including one spring and one linkage with unidirectional actuation, the hooks of two latches are oriented in the same direction, and the hooking direction of the hooks and the compressing direction of the springs (i.e., the direction along which the button is pressed) are different with each other. As to the known latch structure with two springs and two linkages with bi-directional actuation, the hooks of two latches face to each other (as shown in FIG. 6 of Taiwan Patent No. I342737), the hooking direction of the hooks and the compressing direction of the springs are different, and the moving directions of the latches are perpendicular to the forced direction of the button.

However, as to the known latch structure including two springs and two linkages with bi-directional actuation, the latches are able to be returned back due to the springs, and many problems occur in the applications, such as (1) the two springs have different elastic forces, so the moving distances of the latches that are actuated by the button are different; (2) because the moving distances of the latches are different, the button may be inclined and easily stuck; and (3) the latches respectively has two inclined surfaces for contacting the button, but the inclined angles of the inclined surfaces are not easy to be controlled in the manufacturing; also, the inclined surfaces provide large frictions so that it needs a large force to press the button.

Accordingly, how to provide an improved latch device to solve the foregoing problem becomes an important issue to be solved.

SUMMARY

The disclosure provides a latch device. The latch device includes a carrier, an operating member, a resilient member, two linkages, and two latch members. The operating member is operated to move toward or away from the carrier along a first direction. The resilient member is operatively disposed between the operating member and the carrier. Each of the linkages has a first end and a second end. The first ends are pivotally connected to two sides of the operating member respectively, so that the linkages are symmetric relative to the operating member. The latch members are slidably and symmetrically disposed on the carrier along a second direction to be symmetric, and pivotally connected to the second ends of the linkages respectively. The second direction is perpendicular to the first direction. Each of the linkages is located between the corresponding latch member and the operating member in the second direction, so that the latch members and the operating member produce an interlocking relationship. When the operating member is operated to move relative to the carrier along the first direction, the operating member drives the latch members respectively by the linkages, so as to reversely move the latch members relative to the carrier along the second direction to release the latch status of the latch device.

The disclosure further provides a computer system. The computer system includes a tablet computer, a base, and a latch device. The tablet computer has two latch holes. The latch device includes a carrier, an operating member, a resilient member, two linkages, and two latch members. The carrier is disposed in the base. At least a part of the operating member exposes to the exterior of the base. The operating member is operated to move toward or away from the carrier along a first direction. The resilient member is operatively disposed between the operating member and the carrier. Each of the linkages has a first end and a second end. The first ends are pivotally connected to two sides of the operating member respectively, so that the linkages are symmetric relative to the operating member. The latch members are slidably and symmetrically disposed on the carrier along a second direction, pivotally connected to the second ends respectively, and expose to the exterior of the base for respectively engaging with the latch holes, so as to connecting the tablet computer and the base. The second direction is perpendicular to the first direction. Each of the linkages is located between the corresponding latch member and the operating member in the second direction, so that the latch members and the operating member produce an interlocking relationship. When the operating member is operated to move relative to the carrier along the first direction, the operating member drives the latch members respectively by the linkages, so as to reversely move the latch members relative to the carrier along the second direction to release the latch status of the latch device.

Accordingly, the latch device of the disclosure adopts a single spring structure, so the problem of unbalance caused by the deviation between the latches of the known latch structures including two springs can be prevented. In addition, when the operating member of the latch device is pressed, the operating member drives two latch members respectively by two linkages, so that the latch members are forced equally and thus move the same distance. Hence, the problem of unequally forced by the springs encountered by the known latch structure including two springs and the problem of frictions between the latches and the button can be prevented. Furthermore, the latch device of the disclosure retains the spring, and the spring retains the positioning column of the operating member, so as to prevent the operating member from the problem of oblique due to unbalanced forces.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
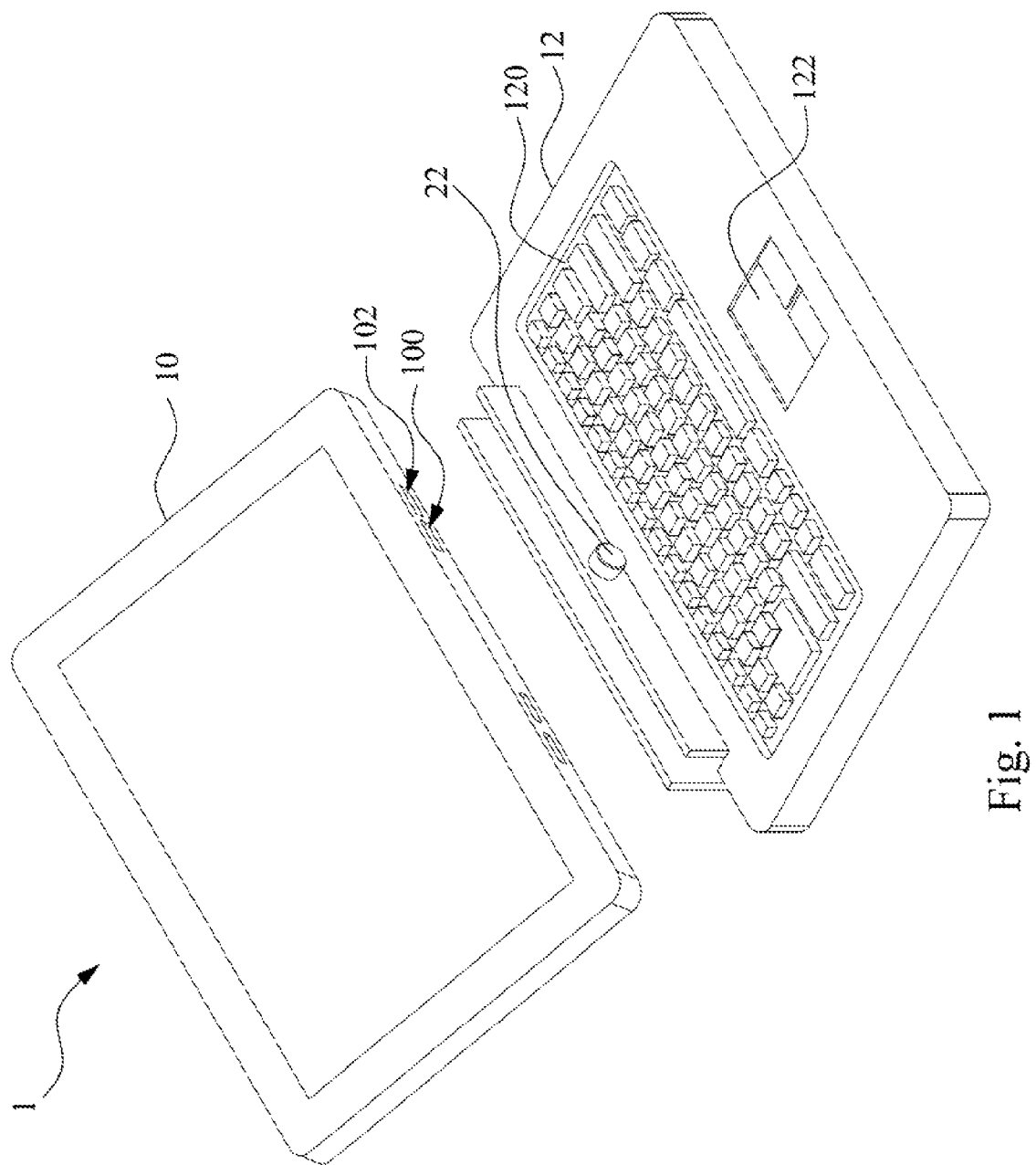
FIG. 1 is an exploded view of a computer system according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is an exploded view of a computer system 1 according to an embodiment of this disclosure.

Figure 3:
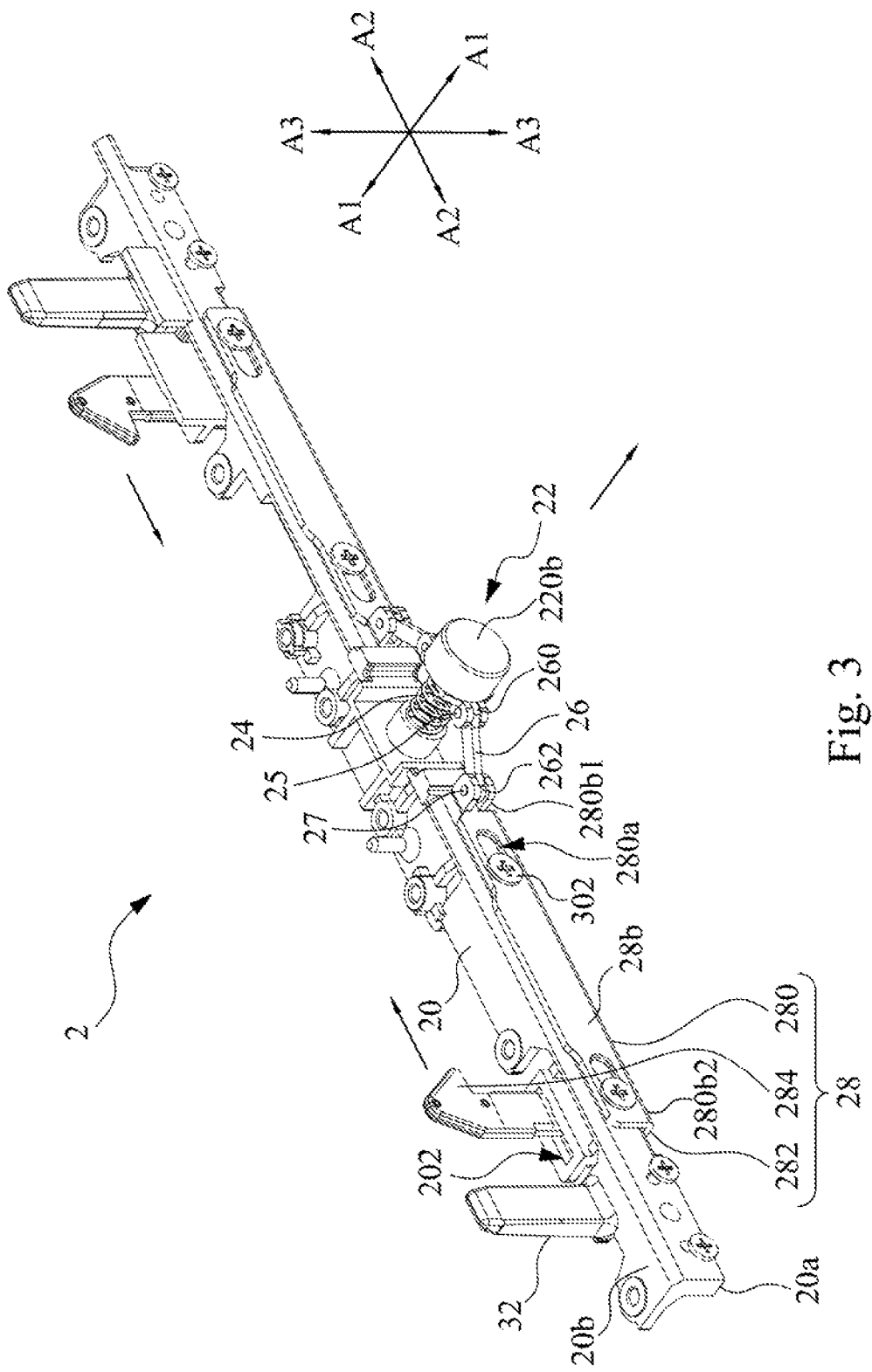
FIG. 3 is a perspective view of the latch device in FIG. 2.

As shown in FIG. 1, the computer system 1 includes a tablet computer 10, a base 12, and a latch device 2 (as shown in FIG. 3). The tablet computer 10 has two latch holes 100 located at the edge of the tablet computer 10. The latch device 2 of the computer system 1 is disposed on the base 12 (only an operating member 22 of the latch device 2 exposes to the exterior of the base 12) for engaging with the latch holes 100 of the tablet computer 10, so as to detachably connect the tablet computer 10 and the base 12. The base 12 of the computer system 1 has a keyboard 120 and a touch pad 122, and the base 12 is capable of transmitting electrical signals to the tablet computer 10 after connecting the tablet computer 10, so a user can input by using the keyboard 120 and the touch pad 122 of the base 12 and display the input result by using the tablet computer 10.

However the latch device 2 is not limited to be applied in the computer system 1 that includes the tablet computer 10 and the base 12 of the embodiment. In another embodiment of the disclosure, the latch device 2 can be applied to a common notebook computer (not shown), so as to engage the host with the display of the notebook computer when the display covers to the host.

Figure 2:
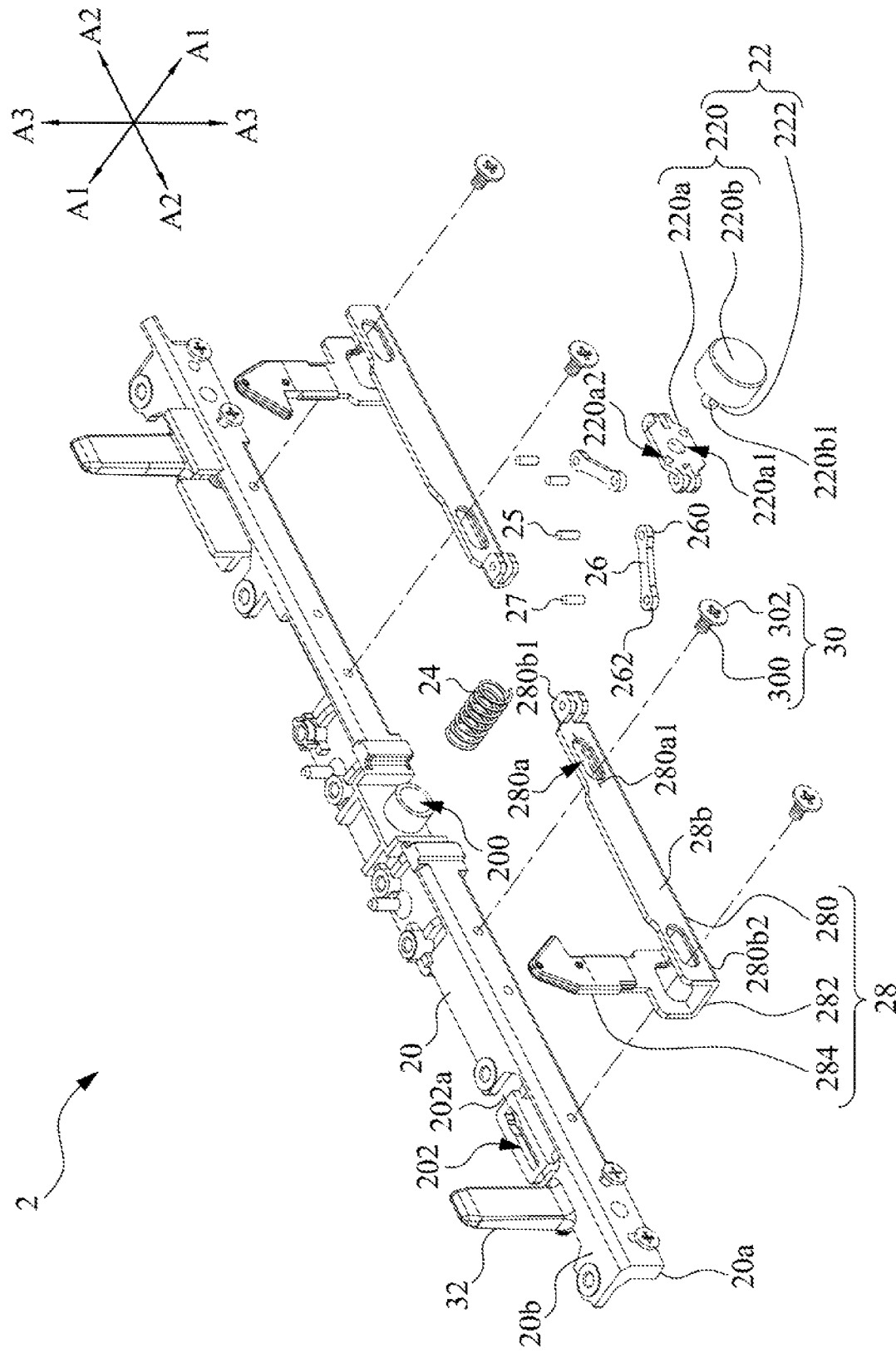
FIG. 2 is an exploded view of a latch device according to an embodiment of the disclosure.
Figure 4:
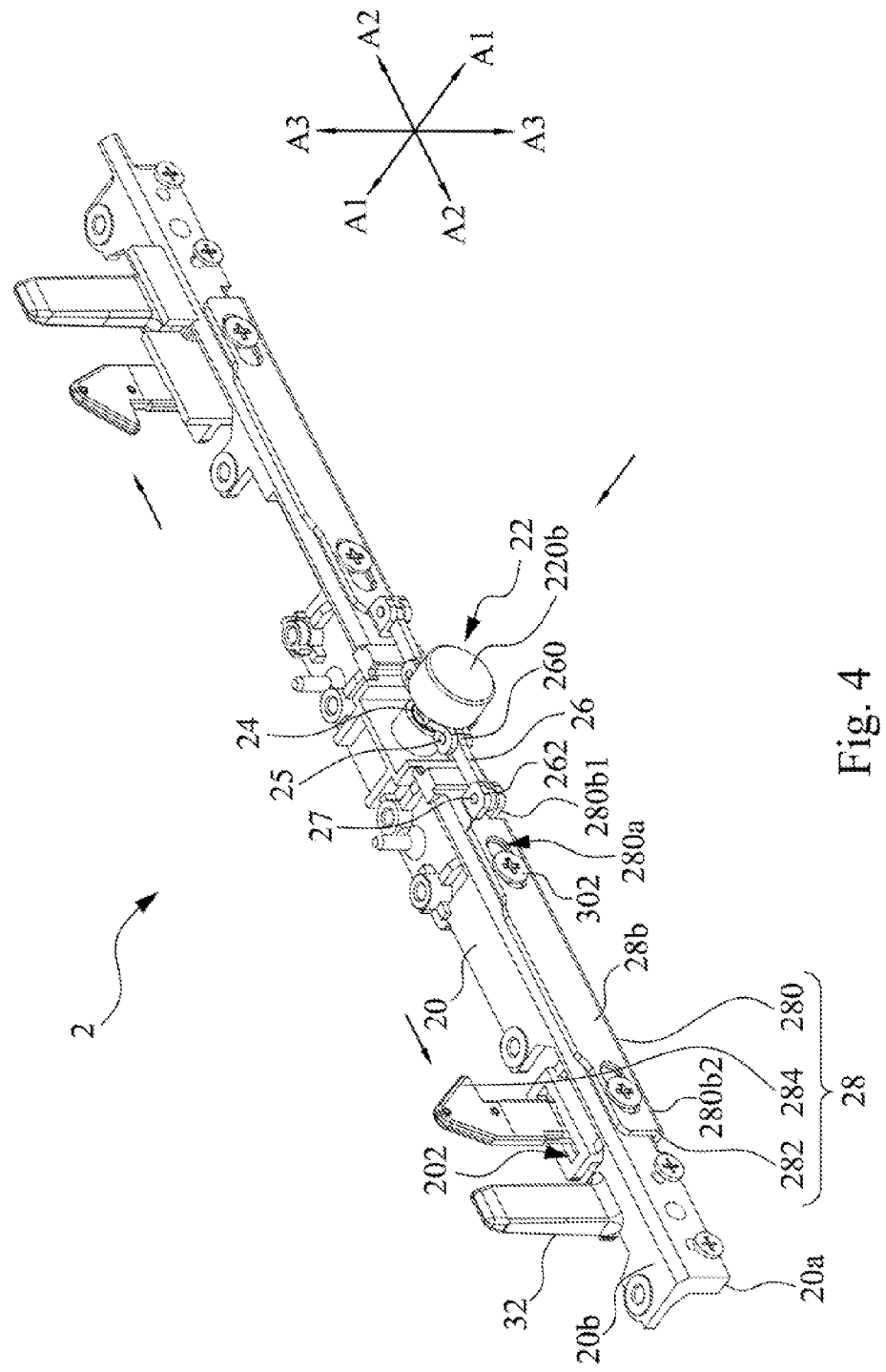
FIG. 4 is another perspective view of the latch device in FIG. 2, in which an operating member is pressed.

FIG. 2 is an exploded view of the latch device 2 according to an embodiment of the disclosure. FIG. 3 is a perspective view of the latch device 2 in FIG. 2. FIG. 4 is another perspective view of the latch device 2 in FIG. 2, in which an operating member 22 is pressed.

As shown in FIG. 2 to FIG. 4 with reference to FIG. 1, the latch device 2 includes a carrier 20, the operating member 22, a spring 24, two first shafts 25, two linkages 26, two second shafts 27, and two latch members 28. The carrier 20 of the latch device 2 is disposed in the base 12. At least a part of the operating member 22 of the latch device 2 exposes to the exterior of the base 12 (as shown in FIG. 1), so as to be pressed to move toward or away from the carrier 20 along a first direction A1. The spring 24 of the latch device 2 is operatively disposed between the operating member 22 and the carrier 20. The linkages 26 of the latch device 2 are symmetrically disposed in the base 12. Each of the linkages 26 has a first end 260 and a second end 262. The first ends 260 of the linkages 26 are pivotally connected to two sides of the operating member 22 by the first shafts 25, respectively. The second ends 262 of the linkages 26 are pivotally connected to the first ends 280b1 of the latch members 28 by the second shafts 27, respectively. The latch members 28 of the latch device 2 are slidably and symmetrically disposed on the carrier 20 along a second direction A2, and partially expose to the exterior of the 12 (not shown in FIG. 1 due to the viewing angle) for respectively engaging with the latch holes 100 of the tablet computer 10. Hence, the base 12 of the computer system 1 can be detachably connected to the tablet computer 10 by using the latch device 2.

In practice, the linkages 26 of the latch device 2 can be tabular or columnar according to designing requirements or space limitations.

It should be pointed out that in the embodiment of the disclosure, the second direction A2 is perpendicular to the first direction A1, and the linkages 26 of the latch device 2 are located between the latch members 28 in the second direction A2. Moreover, the axial direction along which the first end 260 of each of the linkages 26 is pivotally connected to the operating member 22 (i.e., the axial direction of the corresponding first shafts 25) is parallel to a third direction A3. The axial direction along which each of the latch members 28 is pivotally connected to the second end 262 of the corresponding linkage 26 (i.e., the axial direction of the corresponding second shafts 27) is parallel to the third direction A3. Moreover, the third direction A3 is perpendicular to the first direction A1 and the second direction A2. Therefore, when the operating member 22 of the latch device 2 is operated to move relative to the carrier 20 along the first direction A1, the operating member 22 drives the latch members 28 respectively by the linkages 26, so as to reversely move the latch members 28 relative to the carrier 20 along the second direction A2 (as shown in FIG. 3 and FIG. 4).

In detail, the carrier 20 of the latch device 2 has an indentation 200. The indentation 200 of the carrier 20 is used to accommodate a part of the spring 24, so as to retain the spring 24. The operating member 22 of the latch device 2 includes an operating block 220 and a positioning column 222. The spring 24 of the latch device 2 is abutted between the operating block 220 of the operating member 22 and the carrier 20. The positioning column 222 of the operating member 22 is connected to the operating block 220. An end of the spring 24 of the latch device 2 is sleeved onto the positioning column 222 of the operating member 22, so as to retain the positioning column 222. In other words, the indentation 200 of the carrier 20 retains the spring 24, and the spring 24 retains the positioning column 222 of the operating member 22, so as to achieve the purpose of moving the operating member 22 relative to the carrier 20 along the first direction A1, and thus prevent the operating member 22 from the problem of oblique due to unbalanced forces.

Furthermore, the operating block 220 of the operating member 22 includes an abutting plate 220a and a keycap 220b. The abutting plate 220a of the operating block 220 has a through hole 220a1. The positioning column 222 of the operating member 22 passes through the through hole 220a1 of the abutting plate 220a and is connected to the keycap 220b. The keycap 220b of the operating block 220 partially exposes to the exterior of the base 12. The spring 24 is abutted between the abutting plate 220a and the carrier 20. Therefore, when the user presses the keycap 220b of the operating member 22 to move toward the carrier 20 along the first direction A1, the spring 24 is compressed between the abutting plate 220a of the operating block 220 and the carrier 20, and when the user releases the operating member 22, the elastic force of the spring 24 reversely moves the operating member 22 away from the carrier 20 along the first direction A1 and makes the operating member 22 return to its original position.

In addition, the abutting plate 220a of the operating block 220 further has at least one engaging hole 220a2. The keycap 220b of the operating block 220 includes at least one engaging portion 220b1 for engaging with the engaging hole 220a2 of the abutting plate 220a. Therefore, while encountered designing requirements (e.g., the client asks for a keycap with particular appearance) or damages of components (e.g. the keycap 220b that exposes to the exterior of the base 12 is worn), the user can only replace the keycap 220b, rather than the whole operating member 22, so as to obtain the advantage of saving the cost of replacing components.

As shown in FIG. 3 and FIG. 4, the latch device 2 further includes two retaining members 30. The two retaining members 30 of the latch device 2 are disposed on the carrier 20. Each of the latch members 28 of the latch device 2 has a first surface and a second surface 28b opposite to each other. The first surfaces of the latch members 28 face the carrier 20. The retaining members 30 of the latch device 2 respectively extend to the second surfaces 28b of the latch members 28 from the carrier 20, so as to prevent the latch members 28 from leaving the carrier 20 along the first direction A1.

In detail, each of the latch members 28 of the latch device 2 has a first elongated hole 280a. The first elongated hole 280a is communicated with the first surface and the second surface 28b. Each of the retaining members 30 of the latch device 2 includes a neck portion 300 and a head portion 302. The neck portion 300 is connected to the carrier 20 and passes through the first elongated hole 280a of the corresponding latch member 28. The head portion 302 is connected to the neck portion 300 and abuts against the second surface 28b of the corresponding latch member 28, so as to prevent the latch member 28 from leaving the carrier 20 along the first direction A1.

Furthermore, a major axis 280a1 of the elongated hole 280a of each of the latch member 28 is perpendicular to an axial direction along which the corresponding latch member 28 is pivotally connected to the corresponding second end 262 (i.e., the axial direction of the corresponding second shafts 27). In other words, the major axis 280a1 of the elongated hole 280a of each of the latch member 28 is parallel to the second direction A2. Moreover, in the embodiment, the neck portion 300 of each of the retaining members 30 is slidably engaged in the first elongated hole 280a of the corresponding latch member 28, so that the neck portion 300 can achieve the function of limiting the corresponding latch member 28 to move relative to the carrier 20 along the second direction A2 only.

In the embodiment of the disclosure, each of the retaining members 30 of the latch device 2 is a screw, but the disclosure is not limited in this regard. In another embodiment of the disclosure, each of the retaining members 30 of the latch device 2 is extended from the carrier 20 and to the guiding sidewall of the second surface 28b of the corresponding latch member 28, so as to prevent the latch members 28 from leaving the carrier 20 along the first direction A1.

In addition, the carrier 20 of the latch device 2 has a first side 20a and a second side 20b (i.e., the lower side and the upper side in FIG. 2 and FIG. 4) opposite to each other, and has two second elongated holes 202. Each of the second elongated holes 202 of the carrier 20 is communicated with the first side 20a and the second side 20b. A major axis 202a (as shown in FIG. 2) of each of the second elongated holes 202 is parallel to the second direction A2. Each of the latch members 28 of the latch device 2 includes a main body 280, a bending portion 282, and a hook 284. The main body 280 abuts against the carrier 20 and is pivotally connected to the second end 262 of the corresponding linkage 26 with the first end 280b1. The bending portion 282 is connected to the second end 280b2 of the main body 280 and extends to the first side 20a of the carrier 20. The hook 284 is connected to the bending portion 282 and passes through the corresponding second elongated hole 202 from the first side 20a to the second side 20b of the carrier 20. Each of the latch members 28 is substantially U-shaped by viewing from the second direction A2. Each of the second elongated holes 202 of the carrier 20 retains the corresponding hook 284, so as to prevent the corresponding hook 284 from moving relative to the carrier 20 along the first direction A1.

With the foregoing configuration, it can be seen that the hooking direction (i.e., the second direction A2) of the hooks 284 of the latch members 28 is perpendicular to the compressing direction (i.e., the first direction A1) of the spring 24, and the hooks 284 extend along the third direction A3 to pass through the carrier 20, but the disclosure is not limited in this regard.

In another embodiment of the disclosure, the hook 284 of each of the latch members 28 is directly connected to the corresponding main body 280 and extends away from the carrier 20 along the third direction A3 (i.e., the bending portions 282 are omitted, and the hooks 284 and the operating member 22 are located at the same side of the carrier 20).

It can be seen that the hooks 284 and the operating member 22 can be selectively located at the same side or different sides of the carrier 20 as needed, so the design flexibility of the latch device 2 of the disclosure can be increased.

As shown in FIG. 1 with reference to FIG. 2 to FIG. 4, the tablet computer 10 of the computer system 1 further has two slotted holes 102. The slotted holes 102 are located at the edge of the tablet computer 10 and adjacent to the latch holes 100. The latch device further includes two supporting columns 32. Each of the supporting columns 32 of the latch device 2 is disposed on the carrier 20, adjacent to the hook 284 of the corresponding latch member 28, and exposes to the exterior of the base 12 (not shown in FIG. 1 due to the viewing angle). Therefore, when the tablet computer 10 of the computer system 1 is assembled to the base 12, the hooks 284 of the latch members 28 are respectively engaged with the latch holes 100 of the tablet computer 10 and the supporting columns 32 respectively insert into the slotted holes 102 of the tablet computer 10, so as to support the tablet computer 10 to stand relative to the base 12.

As shown in FIG. 3 and FIG. 4, when the operating member 22 is operated to move toward the carrier 20 along the first direction A1 the operating member 22 simultaneously pushes the first ends 260 of the linkages 26 to make the first ends 260 of the linkages 26 move toward the carrier 20 along the first direction A1, and to make the second ends 262 of the linkages 26 reversely move away from each other along the second direction A2 (i.e., the distance between the second ends 262 of the linkages 26 is increased). At the same time, the second ends 262 of the linkages 26 respectively drive the latch members 28 to reversely move relative to the carrier 20 along the second direction A2, so as to release the latch status of the latch device 2 (as switching from FIG. 3 to FIG. 4). On the contrary, when the operating member 22 is operated to move away from the carrier 20 along the first direction A1, the operating member 22 simultaneously pulls the first ends 260 of the linkages 26 to make the first ends 260 of the linkages 26 move away from the carrier 20 along the first direction A1 and to make the second ends 262 of the linkages 26 reversely move toward each other along the second direction A2 (i.e., the distance between the second ends 262 of the linkages 26 is decreased). At the same time, the second ends 262 of the linkages 26 respectively drive the latch members 28 to move relative to the carrier 20 along the second direction A2, so as to perform the latch status of the latch device 2 (as switching from FIG. 4 to FIG. 3).

In the foregoing embodiment, the user can drive the hooks 284 to move away from each other to release the latch status by pressing the operating member 22, but a person having ordinary skill in the art can easily realize that the latch status of the hook 284 can also be released by pulling the keycap 220b. Particularly, in another embodiment of the disclosure, the locations of the spring 24, the first shafts 25, the linkages 26, the second shafts 27, and the latch members 28 are changed from the outer side of the carrier 20 (i.e., the lower right side in FIG. 2) to the inner side of the carrier 20 (i.e., the upper left side in FIG. 2), and only the keycap 220b is located at the outer side of the carrier 20. Furthermore, the positioning column 222 is extended to passes through the carrier 20 and be fixed to the abutting plate 220a located at the inner side of the carrier 20, so that the user can release the latch status by pulling the keycap 220b.

According to the foregoing recitations of the embodiments of the disclosure, it can be seen that the latch device of the disclosure adopts a single spring structure, so the problem of unbalance caused by the deviation between the latches of the known latch structures including two springs can be prevented. In addition, when the operating member of the latch device is pressed, the operating member drives two latch members respectively by two linkages, so that the latch members are forced equally and thus move the same distance. Hence, the problem of unequally forced by the springs encountered by the known latch structure including two springs and the problem of frictions between the latches and the button can be prevented. Furthermore, the latch device of the disclosure retains the spring, and the spring retains the positioning column of the operating member, so as to prevent the operating member from the problem of oblique due to unbalanced forces.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A latch device, comprising:
   a carrier;
   an operating member configured to be operated to move toward or away from the carrier along a first direction;
   a resilient member operatively disposed between the operating member and the carrier;
   two linkages, each of the linkages having a first end and a second end, wherein the first ends are pivotally connected to two sides of the operating member respectively, so that the linkages are symmetric relative to the operating member; and
   two latch members slidably and symmetrically disposed on the carrier along a second direction to be symmetric, and pivotally connected to the second ends respectively, wherein the second direction is perpendicular to the first direction, and each of the linkages is located between the corresponding latch member and the operating member in the second direction, so that the latch members and the operating member produce an interlocking relationship,
   wherein when the operating member is operated to move relative to the carrier along the first direction, the operating member drives the latch members respectively by the linkages, so as to reversely move the latch members relative to the carrier along the second direction to release the latch status of the latch device.

2. The latch device of claim 1, wherein the carrier has an indentation, the resilient member is a spring, and the indentation accommodates a part of the spring, so as to retain the spring.

3. The latch device of claim 1, wherein the resilient member is a spring, and the operating member comprises:
   an operating block, wherein the spring is configured to be operated between the operating block and the carrier; and
   a positioning column connected to the operating block, wherein an end of the spring is sleeved onto the positioning column, so as to retain the positioning column.

4. The latch device of claim 3, wherein the operating block comprises:
   an abutting plate having a through hole and at least one engaging hole, wherein the positioning column passes through the through hole, and the spring is configured to be operated between the abutting plate and the carrier; and
   a keycap connected to the positioning column and comprising at least one engaging portion for engaging with the engaging hole.

5. The latch device of claim 1, further comprising two retaining members disposed on the carrier, wherein each of the latch members has a first surface and a second surface opposite to each other, the first surface faces the carrier, the retaining members respectively extend to the second surfaces from the carrier, so as to prevent the latch members from leaving the carrier along the first direction.

6. The latch device of claim 5, wherein each of the latch members has a first elongated hole, the first elongated hole is communicated with the first surface and the second surface, and each of the retaining members comprises:
   a neck portion connected to the carrier and passing through the corresponding first elongated hole; and
   a head portion connected to the neck portion and abutting against the corresponding second surface.

7. The latch device of claim 6, wherein a major axis of each of the elongated holes is perpendicular to an axial direction along which the corresponding latch member is pivotally connected to the corresponding second end.

8. The latch device of claim 1, wherein the carrier has a first side and a second side opposite to each other, and has two second elongated holes, each of the second elongated holes is communicated with the first side and the second side, a major axis of each of the second elongated holes is parallel to the second direction, and each of the latch members comprises:
   a main body abutting against the carrier and pivotally connected to the corresponding second end;
   a bending portion connected to the main body and extending to the first side; and
   a hook connected to the bending portion and passing through the corresponding second elongated hole from the first side to the second side,
   wherein each of the second elongated holes retains the corresponding hook, so as to prevent the corresponding hook from moving relative to the carrier along the first direction.

9. The latch device of claim 1, wherein an axial direction along which the first end of each of the linkages is pivotally connected to the operating member is parallel to a third direction, an axial direction along which each of the latch members is pivotally connected to the second end of the corresponding linkage is parallel to the third direction, and the third direction is perpendicular to the first direction and the second direction.

10. A computer system, comprising:
a tablet computer having two latch holes;
a base; and
a latch device comprising:
 a carrier disposed in the base;
 an operating member, wherein at least a part of the operating member exposes to the exterior of the base, and the operating member is configured to be operated to move toward or away from the carrier along a first direction;
 a resilient member operatively disposed between the operating member and the carrier;
 two linkages disposed in the base, each of the linkages having a first end and a second end, wherein the first ends are pivotally connected to two sides of the operating member respectively, so that the linkages are symmetric relative to the operating member; and
 two latch members slidably and symmetrically disposed on the carrier along a second direction to be symmetric, pivotally connected to the second ends respectively, and exposing to the exterior of the base for respectively engaging with the latch holes, so as to connecting the tablet computer and the base, wherein the second direction is perpendicular to the first direction, and each of the linkages is located between the corresponding latch member and the operating member in the second direction, so that the latch members and the operating member produce an interlocking relationship,
 wherein when the operating member is configured to be operated to move relative to the carrier along the first direction, the operating member drives the latch members respectively by the linkages, so as to reversely move the latch members relative to the carrier along the second direction to release the latch status of the latch device.

11. The computer system of claim 10, wherein the carrier has an indentation, the resilient member is a spring, and the indentation accommodates a part of the spring, so as to retain the spring.

12. The computer system of claim 10, wherein the resilient member is a spring, and the operating member comprises:
 an operating block, wherein the spring is configured to be operated between the operating block and the carrier; and
 a positioning column connected to the operating block, wherein an end of the spring is sleeved onto the positioning column, so as to retain the positioning column.

13. The computer system of claim 12, wherein the operating block comprises:
 an abutting plate having a through hole and at least one engaging hole, wherein the positioning column passes through the through hole, and the spring is configured to be operated between the abutting plate and the carrier; and
 a keycap connected to the positioning column and comprising at least one engaging portion for engaging with the engaging hole.

14. The computer system of claim 10, wherein the latch device further comprises two retaining members disposed on the carrier, each of the latch members has a first surface and a second surface opposite to each other, the first surface faces the carrier, the retaining members respectively extend to the second surfaces from the carrier, so as to prevent the latch members from leaving the carrier along the first direction.

15. The computer system of claim 14, wherein each of the latch members has a first elongated hole, the first elongated hole is communicated with the first surface and the second surface, and each of the retaining members comprises:
 a neck portion connected to the carrier and passing through the corresponding first elongated hole; and
 a head portion connected to the neck portion and abutting against the corresponding second surface.

16. The computer system of claim 15, wherein a major axis of each of the elongated holes is perpendicular to an axial direction along which the corresponding latch member is pivotally connected to the corresponding second end.

17. The computer system of claim 10, wherein the carrier has a first side and a second side opposite to each other, and has two second elongated holes, each of the second elongated holes is communicated with the first side and the second side, a major axis of each of the second elongated holes is parallel to the second direction, and each of the latch members comprises:
 a main body abutting against the carrier and pivotally connected to the corresponding second end;
 a bending portion connected to the main body and extending to the first side; and
 a hook connected to the bending portion and passing through the corresponding second elongated hole from the first side to the second side,
 wherein each of the second elongated holes retains the corresponding hook, so as to prevent the corresponding hook from moving relative to the carrier along the first direction.

18. The computer system of claim 10, wherein an axial direction along which the first end of each of the linkages is pivotally connected to the operating member is parallel to a third direction, an axial direction along which each of the latch members is pivotally connected to the second end of the corresponding linkage is parallel to the third direction, and the third direction is perpendicular to the first direction and the second direction.

19. The computer system of claim 10, wherein the tablet computer further has at least one slotted hole, and the latch device further comprises at least one supporting column which is disposed on the carrier and exposes to the exterior of the base for inserting into the slotted hole, so as to support the tablet computer to stand relative to the base.

* * * * *